United States Patent [19]

Sukup

[11] 3,715,973
[45] Feb. 13, 1973

[54] APPARATUS FOR HEATING GRAIN OR THE LIKE

[76] Inventor: Eugene G. Sukup, Dougherty, Iowa 50433

[22] Filed: July 13, 1970

[21] Appl. No.: 54,374

[52] U.S. Cl. ............................................... 99/8
[51] Int. Cl. ........................................ B01d 7/16
[58] Field of Search ..... 99/234, 235 R, 235 A, 235 S, 99/8, 2, 7; 259/157, 158, 155, 156

[56] References Cited

UNITED STATES PATENTS

| | | | |
|---|---|---|---|
| 1,420,008 | 6/1922 | Wikel | 99/235 A |
| R26,786 | 2/1970 | Plumb | 259/157 |
| 2,597,442 | 5/1952 | Borrow | 99/235 R |
| 3,343,961 | 9/1967 | Truax | 99/235 R |
| 2,793,582 | 5/1957 | Rothe | 99/235 R |

Primary Examiner—Robert W. Jenkins
Attorney—Pendleton, Neuman, Williams & Anderson

[57] ABSTRACT

A pair of vertical auger conveyors are provided in one compartment of a dual compartment storage bin, and a return guide tube in the opposite compartment. A burner at the lower end of each conveyor effects combustion upward along the conveyor walls for heating grain as it moves up each auger conveyor. Raw grain from one compartment enters the lower end of one auger conveyor and is partially heated as it ascends this conveyor, then free-falls through the guide tube to the lower end of the second auger conveyor, and is heated further as it is moved upward in the second conveyor from whence it is discharged to the second compartment. The burners are controlled in response to the temperature of the grain to obtain the desired heating.

25 Claims, 9 Drawing Figures

INVENTOR
Eugene G. Sukup
BY Pendleton, Neuman, Williams & Anderson
ATTORNEYS

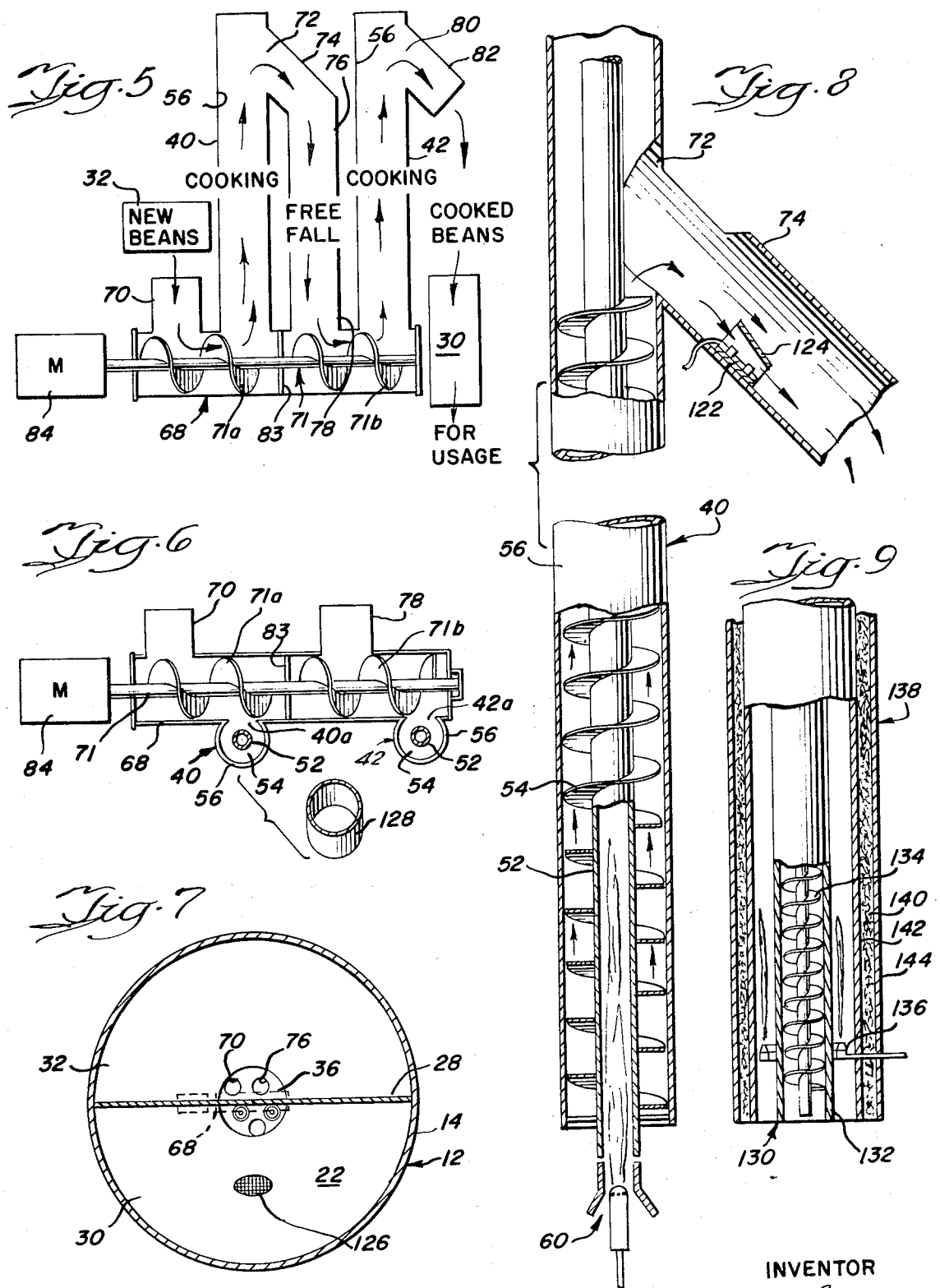

APPARATUS FOR HEATING GRAIN OR THE LIKE

This invention relates to apparatus and processes for heating grain or like materials and more particularly to such apparatus and processes whereby soybeans or other grains can be cooked in an economical operation. It is a more particular object of this invention to provide such apparatus and processes which make it economically feasible for a farmer or small feedlot operator to own the necessary equipment and conveniently carry out the process of cooking soybeans or other grains for use in his own livestock feeding operation.

Research and practical experience have demonstrated that it is advantageous, and sometimes necessary, to heat or cook various grains prior to consumption in a livestock feeding operation. Examples include the heating of soybeans to a temperature sufficiently high to destroy or alter certain naturally occurring enzymes or enzymatic compounds to preclude deleterious effects otherwise encountered in feeding soybeans to livestock. This requires heating the beans to a temperature on the order of about 215°F. Such heating or cooking also renders the beans more palatable and increases feed conversion efficiency. Other examples include the heating and "popping" of milo (grain sorghum) to fracture the hard outer shell of the grains, and the heating or cooking of corn or other grains to obtain better feed conversion efficiencies. This invention is applicable to such heating and cooking operations, and will be described in a particular advantageous embodiment with respect to the cooking of soybeans.

Various apparatus and processes have been provided heretofore for cooking soybeans and like grains. However, the apparatus involved has been too expensive to economically justify ownership of the necessary apparatus to carry on such a heating or cooking operation as part of small or medium-sized livestock feeding operations.

It is an object of this invention to provide improved apparatus and processes for the heating of grain such as soybeans.

It is another object of this invention to provide improved apparatus and processes whereby grain and the like may be heated under controlled conditions utilizing inexpensive equipment in an economical operation.

It is a specific object of this invention to provide simple, inexpensive apparatus to convert raw soybeans into a satisfactory product for feeding to livestock.

It is a further object of this invention to provide an integrated, economical unit for storing grain, heating or cooking such grain under controlled conditions and storing the resulting product.

Further and additional objects and advantages of this invention will appear from the description, accompanying drawings and appended claims.

In carrying out this invention in one particularly advantageous illustrative form, an auger conveyor is provided having a hollow center tube, a surrounding casing spaced from the tube, and an auger flight between the tube and the casing. This auger conveyor is vertically arranged, and means are provided for feeding grain or the like to the lower end thereof, with means for rotating the auger flight to move the grain longitudinally of the conveyor from the lower end to the upper end. A burner is disposed adjacent the lower end of the conveyor and directed upward to effect combustion within the hollow center tube for heating the grain as it moves upward within the conveyor. The grain discharged from the upper end of the conveyor is returned through a drop conduit to the lower end of another vertical auger conveyor corresponding to the first described conveyor and also having a burner directed into the lower end of the hollow core for further heating of the grain during its upward traverse of the second conveyor. The two conveyors and return tube preferably are installed within a multicompartment storage bin with a free supply of raw grain from one compartment to the lower end of the first vertical conveyor and with discharge of the processed product from the upper end of the second conveyor to another compartment.

For a more complete understanding of this invention reference should now be had to the embodiments illustrated in greater detail in the accompanying drawings and described below by way of example of the invention. In the drawings:

FIG. 5 is a schematic diagram of the flow of soybeans through the apparatus of FIG. 1;

FIG. 6 is an enlarged sectional view taken generally along line 6—6 of FIG. 4 and looking in the direction of the arrows (with FIG. 6 rotated 90° counterclockwise relatively to FIG. 4);

FIG. 7 is a schematic sectional view taken generally along line 7—7 of FIG. 1 and looking in the direction of the arrows;

FIG. 8 is an enlarged elevation view, partially in section, of one of the cooker-conveyors of FIG. 1, and FIG. 9 is an elevation view, partially in section of a modified cooker-conveyor employing certain teachings of this invention.

Figure 1:
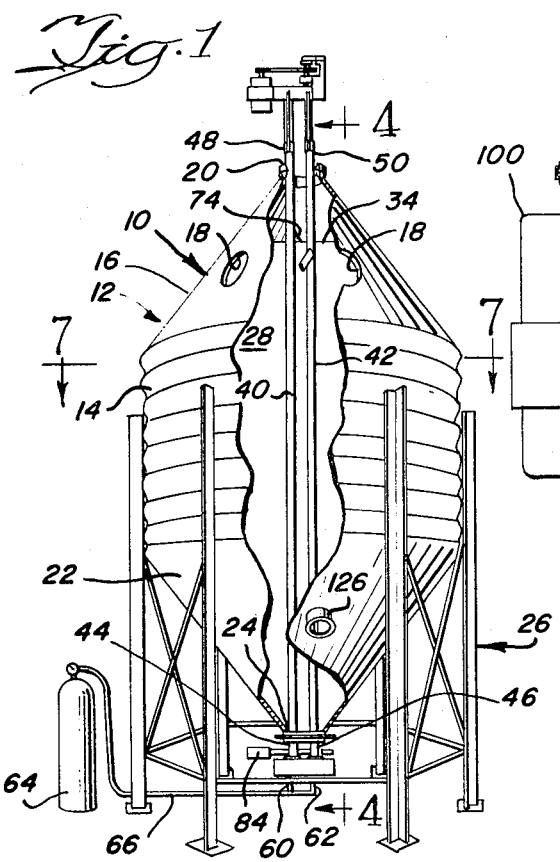
FIG. 1 is a schematic elevational view, partially in section, of a storage bin and heating apparatus employing teachings of this invention.
Figure 2:
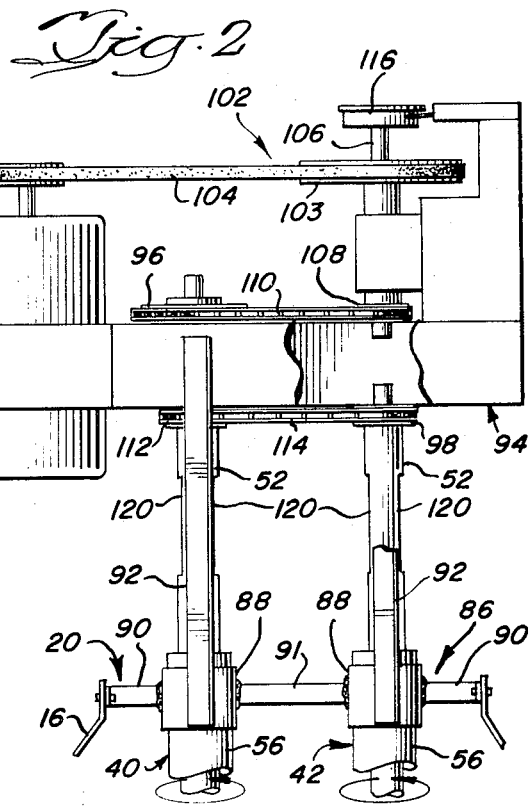
FIG. 2 is an enlarged elevation of the drive mechanism at the top of the apparatus of FIG. 1.

Referring to FIGS. 1, 2 and 7, the integrated storage and cooker unit 10 includes a grain storage tank or bin 12 of a generally known commercial construction. Such a bin unit includes a right circular cylindrical portion 14, an upper truncated conical portion 16 provided with filler openings 18 and a center top opening 20, and a truncated conical lower portion 22 which facilitates gravity feeding to a lower end at 24. An appropriate framework 26 is provided for supporting the bin 12 in a vertical position whereby the contents normally will automatically feed out the lower end 24 by gravity.

A transverse dividing wall 28 is provided within the bin 12 to divide the storage space therein vertically into two compartments 30 and 32. The upper end 34 of the wall 28 terminates somewhat below the opening 20 to accommodate portions of the apparatus to be described below. At its lower end the wall extends to a floor or bottom wall 36 at the lower opening 24.

A pair of parallel, vertical auger conveyors 40 and 42 extend through the compartment 30, having their lower end portions 44 and 46 extending beneath wall 36 (see FIG. 3), and their upper end portions 48 and 50 extending above the upper opening 20, as illustrated.

Referring more particularly to FIG. 8, each of the auger conveyors 40 and 42 includes a hollow center tube 52 having helical conveyor flighting 54 secured thereto. An outer cylindrical casing 56 surrounds the flighting 54, with relatively little clearance therebetween to provide positive vertical movement of grain through each of the conveyors upon rotation of the augers. The pitch of the flighting, friction characteristics of the various surfaces, and the other parameters are selected to provide the desired movement. Furthermore, a positive drive forcing grain into the auger further insures the desired movement. The specific dimensions of the auger conveyors and other parameters also are selected to be appropriate to the materials to be handled and the production rate contemplated. By way of example, a central supporting pipe 52 having an O.D. of 2⅞ inches (2½ inches I.D.), with flighting 54 having a radial dimension of three-fourths inch and a 3 inch pitch, and an outer tubular casing 56 of 4¾ inches O.D. (4⅝ inches I.D.) has been found satisfactory for cooking soybeans as described below, with each auger being rotated at about 125 RPM. Experience to date has indicated that if the system is to be used for corn or milo, a 3½ inches O.D. inner pipe 52 is preferred, with an outer tubular casing 56 of 6 inches O.D. and appropriate flighting to substantially fill the radial gap between the core 52 and the casing 56.

Figure 3:
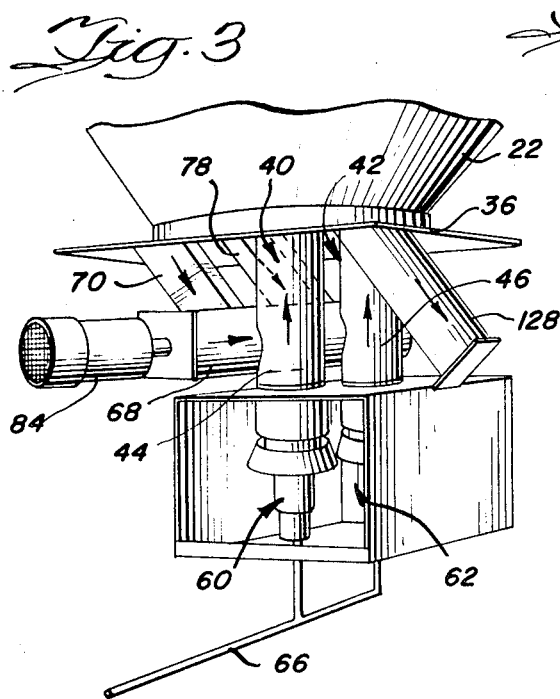
FIG. 3 is an enlarged perspective of the cross-conveyor, burners and related mechanism at the bottom of the apparatus of FIG. 1.

As seen in FIGS. 1, 3 and 8, a pair of burners 60 and 62 are positioned at the lower ends of the two auger conveyors 40 and 42. These burners are conventional, commercially available units, such as for burning liquid propane fuel. Each burner is positioned to project a combustible mixture of gases upward into the respective center tube 52, thereby to sustain combustion within the tubes for heating the grain as it is elevated through the auger conveyors. A reservoir tank 64 and feedline 66 for the liquid propane are illustrated schematically in FIG. 1.

Figure 4:
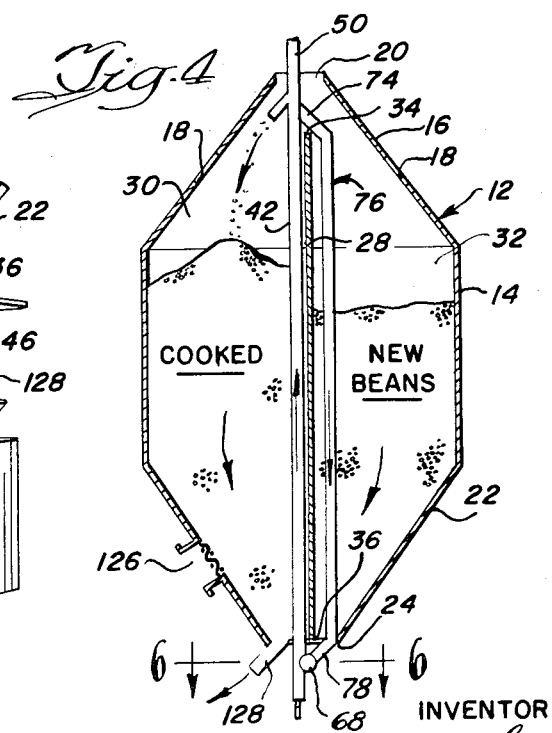
FIG. 4 is a schematic vertical sectional view taken generally along line 4—4 of FIG. 1 and looking in the direction of the arrows.

Within the illustrated apparatus 10, the grain is cycled through the two conveyors 40 and 42, in sequence, to complete the heating and cooking operation. A cross-conveyor 68 is provided adjacent the lower end portions 44 and 46 of conveyors 40 and 42 to assist in appropriate transfers of the grain into the respective vertical augers. Referring particularly to FIGS. 3, 5 and 6, a conduit 70 extends from an appropriate opening in bottom wall 36 within compartment 32 to a front portion of the conveyor 68 for free gravity feeding of the raw grain to the cross-conveyor. An auger 71 in the conveyor 68 transfers the grain from the outlet of conduit 70 to an appropriate inlet opening 40a through the casing 56 of the vertical auger conveyor 40. The casing 56 of the conveyor 40 is provided with another lateral opening 72 (FIG. 5) in the upper portion of the bin 12 where this auger discharges into the upper end portion 74 of a return guide tube 76. The return guide tube 76 conveniently is positioned within the compartment 32. The guide tube portion 74 extends downwardly at an angle, over the upper end 34 of wall 26, to this compartment (see FIG. 4). At the lower end of guide tube 76, an angularly disposed lower portion 78 directs the freely falling grain into the casing of the transverse conveyor 68 between conveyors 40 and 42. The conveyor 68 then transfers the grain to the vertical auger conveyor 42, through a side opening 42a in the casing 56 thereof, for elevation in the auger 42 to a discharge opening 80 wherein a guide 82 directs the grain into the compartment 30.

As seen in FIGS. 5 and 6, the transverse conveyor 68 includes two separate lengths of helical auger flighting, one flight 71a for effecting transfer of the grain from the inlet conduit 70 to the first vertical auger conveyor 40 and another flight 71b for transferring the grain from the guide tube 76 to the second vertical auger conveyor 42. A transverse dividing wall 83 is provided within the outer casing of the cross-conveyor 68 and between the two helical flights, to preclude mixing of the grain between the two zones of traversing this conveyor. This transverse wall is provided with an appropriate opening to accommodate the common drive-shaft whereby both of these conveyor units are driven by a single motor 84.

The use of a positive feed conveyor 68 at the inlet is particularly advantageous in overcoming problems that may arise in obtaining proper feeding movement of grain under certain adverse conditions of heat and moisture in this area.

The input conduit 70 and the lower portion 78 of guide tube 76 preferably are of foraminous material to provide for visual observation of the operation of the equipment and to provide for removal of some fines from the grain.

Referring now to FIGS. 1 and 2, the upper ends of the respective casings 56 are secured to the upper portion of the bin 12 around opening 20, as by a framework 86 comprising sleeves 88 and struts 90 and 91. Support legs 92 of angle iron are suitably secured to the sleeves 88, as by welding, and support a framework 94 above the upper ends of the auger conveyors 40 and 42. The upper ends of the respective center tubes 52 are suitably jointed to sprockets 96 and 98 journaled on the frame 94 to be driven by a motor 100 through an appropriate drive train 102. The illustrated drive train 102 includes a pulley 103 driven from the motor 100 by a V-belt 104. The pulley 103 drives a shaft 106 which is journaled on the frame 94 and carries a sprocket 108. A roller chain 110 drives sprocket 96 from sprocket 108 for rotating the auger of conveyor 40. A further sprocket 112 is mounted on the drive shaft of auger 40 and drives a further roller chain 114 for rotating sprocket 98 and thereby rotating the auger of conveyor 42.

A centrifugal safety switch 116 is mounted on the pulley 103 is suitably interconnected with the controls of the burners. This switch provides a safety feature to shut down the burners and avoid burning of the grain in the conveyors 40 and 42 in the event rotation of the augers is halted for any reason.

A pair of lateral openings 120 is provided in the upper end of each center tube 52, above the upper ends of casings 56, for venting the products of combustion from each of these tubes.

General control of the degree of heating of the grain is obtained by such general parameters as the diameter, length, pitch and rate of rotation of the vertical augers as well as the heat output of the burners. By way of example, burners having outputs on the order of 250,000 BTU/hr. per burner have provided satisfactory cooking of soybeans in apparatus of the type and dimensions described above wherein the two conveyor-cooker units 40 and 42 each were about 16' long. The augers were operated at about 125 RPM, and the beans took about 4 minutes to move from the inlet 70 to the outlet 82, with the apparatus providing about 600 lb. of cooked soybeans per hour. The raw beans were at a temperature of about 70°F., thus attaining an overall temperature rise of about 170°F., or about 42.5° per minute. Obviously the temperature rise required will vary considerably depending upon the season and thus the temperature of the raw beans. With raw beans at 0°F., the temperature rise would be 240° F., or on the order of 60° per minute. It has been found that shortening the length of travel with a corresponding decrease in auger speed or a corresponding increase in temperature results in a less desirable operation.

Within the limits of a general design, more accurate control of the heating is necessary than is provided by the overall design to insure that the material, e.g., soybeans, is heated to the temperature necessary to obtain the desired results while avoiding undesirable scorching, burning or deterioration of the product. To this end appropriate temperature sensors may be installed at suitable points and connected to appropriate controls for modulating the burners and/or varying the speed of the drive of the auger conveyors 40 and 42. In one extremely simple and advantageous embodiment, the desired temperature control can be effected by controlling the burner 60 of the first conveyor 40 in a simple on-off mode in response to the temperature of the grain at the upper discharge opening of this conveyor, with a safety shut-down sensor provided at the discharge of the second auger 42. Referring, for instance to FIG. 8, a temperature sensor 122 is positioned in the discharge outlet 74 whereby the sensor will be continually immersed in beans newly discharged from the conveyor 40. This sensor is connected to appropriate controls for turning the burner 60 on and off in response to sensed lower and upper temperature limits, respectively, e.g., 135°F. and 140°F. in cooking soybeans. That is, this sensor operates controls to shut off the burner 60 if the temperature of the beans at the sensor goes above 140°F., and to restart the burner 60 when the temperature of the beans at this point drops below 135°F.

The second sensor (not shown) is similarly installed in the outlet 82 from the second vertical auger 42 and is set and connected to the various controls to automatically shut down the entire operation if the temperature of the grain at this points drops below a predetermined minimum value. For instance, in cooking soybeans this sensor may be set to stop the apparatus if the apparent temperature of the beans at the output falls below 240°F. Such an apparent or sensed temperature insures that the entire bean has reached the minimum temperature required to obtain the desired results.

Referring further to FIG. 8, each of the sensors is disposed in a small, hollow, truncated conical receptacle 124 positioned in the discharge guide from the respective conduit. Such a receptacle serves to restrict the flow of grain to insure exposure of the sensor to the grain being discharged, while permitting some grain flow therethrough and thereby insuring the presence of newly discharged grain for accurate sensing purposes at all times.

The heated grain being dropped into compartment 30 may be cooled by providing an appropriate air inlet 126 thereto through the lower portion of the conical wall 22 (FIGS. 1 and 4), with appropriate blower means (not shown) for forcing ambient air through this inlet and upward through the grain in this compartment. The cooling air is vented through a weather protected opening 18 and/or the center opening 20.

In summary of the operation of the aforedescribed apparatus, and referring particularly to FIG. 5, raw beans flow by gravity from compartment 32 through the conduit 70 into the transverse conveyor 68 which discharges them into the lower end of the vertical cooker-conveyor 40. As the beans are elevated through the conveyor 40, the burner 60 is operated to project a combustible mixture into the hollow center of tube 52, with combustion being sustained in a zone extending a substantial distance upward into this tube, e.g., 4-8'. The warmed or partially heated beans are discharged from the upper end of conveyor 40 and free fall through guide tube 76 to immediately re-enter the cross-conveyor 68 which, in turn, discharges these warmed beans into the lower end of conveyor 42. As these beans then ascend through conveyor 42, the burner 62 is sustaining combustion within the tube 56 of this conveyor, in the manner described with respect to burner 60 and conveyor 40, to complete the heating of the beans to the desired temperature prior to their discharge from the upper end of conveyor 42 from whence they fall into the storage compartment 30. The heated beans are cooled by air driven through the cooling access 126 and repose in the storage compartment 32 until removed by the operation through discharge spout 128, as desired, for use.

It will be appreciated that a substantial quantity of material, e.g., beans, such as may be needed in a livestock feeding operation over several days time, may be cooked in one continuous operation. For instance, assuming a bin 12 of 500 bushel capacity, 250 bushels of raw beans may be charged to the compartment 32, then cooked in a single continuous automatically controlled operation as described, and subsequently used in appropriate quantities from time-to-time until the compartment 30 is substantially emptied. Thereupon the filling and cooking cycle may be repeated. Thus, the bin serves as temporary storage for raw and/or cooked beans, and the operator can prepare a batch for subsequent use in smaller quantities over a period of time, as in a daily feeding operation.

It also has been found possible to cook soybeans in the manner described above within a single conveyor-cooker unit like unit 40 or 42 about 16 feet long, if the beans are moved very slowly and if sufficient heat is applied. However, considerable difficulties were experienced, apparently due to high rates of moisture release or "sweating" and related packing problems arising from the use of high temperatures and rapid rates of heating. Careful attention and control of the operation were required.

The use of two parallel auger-cookers to obtain the desired heating and cooking has been found advantageous in that the grain can be heated relatively slowly while maintaining adequate conveying motion for good mixing and stirring action. The slow heating is particularly advantageous in heating material such as soybeans to avoid the sweating and packing problems alluded to above. Of course, similar results could be obtained by a single conveyor unit of adequate length, and with a plurality of heating units spaced along its length. However, practical considerations of installation within the height of storage units and equipment commonly available and economically feasible for smaller livestock feeding operations render it distinctly advantageous to utilize a plurality of separate, parallel units to obtain the desired length of heating exposure of the grain product. In addition, while it is not clearly established, there may be some advantage in interrupting the heating process and obtaining the additional stirring and aeration inherent in the free fall of the grain from the top of the first conveyor to the lower end of the second conveyor.

The process of this invention is believed to be clear from the foregoing. However, in outline, it comprises conveying the grain along an auger conveyor, thereby keeping the material in continuous lineal motion and with continual mixing and turning, and heating the grain by heat applied through a wall of the conveyor passageway as the material is being conveyed. The continual movement, mixing and stirring of the individual grains due to the manner of conveyance insures uniform heating and avoids scorching and localized overheating, while also avoiding sticking, "sweating" and packing problems that may be encountered in other types of heating or cooking operations.

The embodiment illustrated in FIG. 9 utilizes certain of the broader principles of the aforedescribed preferred embodiment of the conveyor-heaters. In the embodiment of FIG. 9, heat is applied to the material being conveyed by combustion carried out externally of the conveyor casing. This unit comprises a vertical, auger-type conveyor 130 having a circular cylindrical casing 132 within which the helical flighting 134 is rotated. An annular burner 136 circumscribes the casing 132 and is supplied with an appropriate fuel, such as liquid propane, to effect combustion in the area circumjacent the casing 132. An outer cylindrical shell 138 preferably is of a highly insulative construction, such as comprising a mineral wool or a cellular heat resistant insulating material 140 confined between two skin panels 142 and 144 which may include reflective insulating coatings or foils. The shell 138 confines the heat and avoids undue heating of surrounding material, such as in the passage of such a conveyor-cooker unit through a reservoir of grain when installed in a bin as in the embodiment of FIGS. 1-8. The burner 136 may be positioned within this annular space as illustrated in FIG. 9, or may be positioned at the lower or inlet opening of the annular space between the conveyor 130 and the jacket 138, similar to the position of the burners in the embodiment of FIGS. 1-8.

It will be appreciated that the embodiment of FIGS. 1-8 possesses several advantages over the embodiment of FIG. 9. Among these is the fact that in the embodiment of FIGS. 1-8 the combustion area is inherently confined within the material being heated. Thereby, the material being heated absorbs the heat around the combustion area and inherently avoids undesirable escape of the heat to the area or material surrounding the conveyor-heater apparatus. Also, the embodiment of FIGS. 1-8 utilizes less components, in that there is no need for an insulating jacket 138, and avoids the need for an annular burner or a plurality of burner units annularly disposed, whereby it is of simpler less expensive construction. Accordingly, the embodiment of FIGS. 1-8 comprises the preferred embodiment of the apparatus of this invention.

It will be obvious that other modifications of the specific embodiments shown may be made without departing from the spirit and scope of this invention.

Novel apparatus and processes thus have been provided which meet the objects of this invention.

While particular embodiments of this invention are illustrated and described herein, it will be understood, of course, that the invention is not to be limited thereto since many modifications may be made by those skilled in the art, particularly in light of the foregoing teachings. It is contemplated, therefore, by the appended claims to cover any such modifications as fall within the true spirit and scope of this invention.

What is claimed is:

1. Apparatus for heating grain or like material comprising an auger conveyor having conveyor walls defining an elongated passageway and an auger flight in said passageway, means for feeding grain or the like to said conveyor, drive means for rotating said flight to move such material along such passageway, means defining a chamber along one of said conveyor walls wherein said chamber has a wall which also comprises said conveyor wall, and burner means disposed to effect combustion in said chamber adjacent to said one of said conveyor walls on the side thereof external to said passageway for heating such material in said conveyor by heat transferred through said conveyor wall.

2. Apparatus as in claim 1 wherein said walls define a passageway which is closed in cross section.

3. Apparatus as in claim 2 wherein said conveyor is disposed with said passageway extending at a substantial angle to the horizontal.

4. Apparatus as in claim 3 wherein said drive means rotates said flight in a direction to move such material upward along said passageway.

5. Apparatus for heating grain or like material comprising an auger conveyor having a hollow center tube which defines an elongated central chamber and also comprises an inner wall of said conveyor, a casing spaced from said tube and an auger flight between said tube and said casing, means for feeding grain or the like to said conveyor, means for rotating said flight to move such material longitudinally of said conveyor between said inner wall and said casing, and burner means disposed to effect combustion within said chamber along said inner wall for heating such material in said conveyor by heat transferred through said inner wall.

6. Apparatus as in claim 5 wherein said casing defines a passageway which is closed in cross section.

7. Apparatus as in claim 6 wherein said conveyor is disposed with said passageway extending generally vertical.

8. Apparatus as in claim 7 wherein said drive means rotates said flight in a direction to move such material upward along said passageway.

9. Apparatus as in claim 7 wherein said center tube is provided with a vent opening adjacent its upper end for exhausting the products of such combustion.

10. Apparatus for storing and heating grain comprising a storage bin having a plurality of compartments, an auger conveyor having walls defining an elongated passageway and an auger flight extending along said passageway, means for feeding grain from a first of said compartments to an intake portion of said conveyor, means for rotating said flight to move such material along such passageway from said intake portion to an output portion thereof, further means to return grain from said output portion to a second of said compartments, and means for applying heat to one of said walls on the side thereof external to said passageway for heating such material in said conveyor.

11. Apparatus as in claim 10 wherein said auger conveyor extends vertically in said second compartment.

12. Apparatus as in claim 10 wherein said conveyor includes a hollow center tube and said means for applying heat comprises burner means disposed to effect combustion within said hollow center tube.

13. Apparatus for storing and heating grain comprising a storage bin having a plurality of compartments, first and second vertically extending parallel auger conveyors, each of said conveyors having walls defining an elongated passageway which is closed in cross section and an auger flight extending along said passageway, means for feeding grain from a first of said compartments into the lower portion of said first conveyor, means including a guide tube disposed to receive grain from the upper portion of said first conveyor and direct such grain to the lower portion of said second conveyor, means for rotating said flights to move such grain upward in said conveyors along such passageways, further means to direct grain from the upper portion of said second conveyor to a second of said compartments, and means for applying heat to one of said walls of each of said conveyors on the side thereof external to said passageway for heating such material in said conveyors.

14. Apparatus as in claim 13 wherein each of said conveyors includes a hollow center tube and said means for applying heat thereto comprises a burner at the lower end of the respective conveyor and disposed to direct combustible gases upward in the respective hollow center tube.

15. Apparatus as in claim 14 wherein said means for rotating said flight comprises a drive motor disposed adjacent the upper ends of said conveyors and means drive connecting said motor to the upper end portions of said center tubes, each of said tubes having lateral openings therein adjacent its upper end for venting the products of such combustion.

16. Apparatus as in claim 13 including temperature controls comprising means responsive to the temperature of grain discharged from the upper portion of said first conveyor for controlling said means for applying heat to said first conveyor.

17. Apparatus as in claim 16 wherein said controls include means responsive to the temperature of grain discharged from the upper portion of said second conveyor for controlling the operation of said apparatus.

18. Apparatus as in claim 13 wherein said first and second conveyors are disposed in said second compartment and said guide tube is disposed in said first compartment.

19. Apparatus as in claim 13 including a cross-conveyor adjacent the lower end portions of said conveyors and communicating therewith and with said guide tube, and an inlet passage from said first compartment to said cross-conveyor, said cross-conveyor comprising two flights, one of said flights being operative to convey grain from said inlet passage to said first conveyor, and the other of said flights being operative to convey grain from said guide tube to said second conveyor.

20. Apparatus for heating grain or like material comprising first and second auger conveyors, each of said conveyors having walls defining an elongated passageway which is closed in cross section and an auger flight extending along said passageway, means for feeding such material into one portion of said first conveyor, means to transfer such material from a second portion of said first conveyor remote from said first portion to a first portion of said second conveyor, said second conveyor having a discharge section at a second portion remote from said first portion thereof, means for rotating said flights to move such material along each of said conveyors from said first portion to said second portion thereof, and means for applying heat to one of said walls of each of said conveyors between said first and second portions thereof and on the side of the respective wall external to said passageway for heating such material in said conveyors by heat transferred through said walls.

21. Apparatus as in claim 20 wherein said means for applying heat to said one of said walls of each of said conveyors comprises burner means disposed to effect combustion adjacent said external side or said one of said conveyor walls.

22. Apparatus as in claim 20 wherein each of said conveyors includes a hollow center tube which defines an elongated central chamber and also comprises an inner wall of said conveyor, and a casing spaced from said tube, said auger flight of each conveyor being disposed between the respective tube and casing, and said means for applying heat to each of said conveyors comprising burner means disposed to effect combustion within said chamber along said inner wall.

23. Apparatus as in claim 20 wherein said conveyors are in substantially parallel side by side relationship with one another and extend at a substantial angle to the horizontal, said second portions being above said first portions.

24. Apparatus as in claim 23 wherein said transfer means comprises a guide tube disposed to receive such material from said second portion of said first conveyor and direct such material to said first portion of said second conveyor.

25. Apparatus as in claim 23 wherein said conveyors are vertically disposed.

* * * * *

UNITED STATES PATENT OFFICE
CERTIFICATE OF CORRECTION

Patent No. 3,715,973             Dated February 13, 1973

Inventor(s)    Eugene G. Sukup

It is certified that error appears in the above-identified patent and that said Letters Patent are hereby corrected as shown below:

Column 4, line 42, "jointed" should read -- joined --; Column 4, line 55, after "103" insert -- and --; Column 5, line 55, "points" should read -- point --; Column 6, line 38, "operation" should read -- operator --; and Column 10, line 39, "or" should read -- of --.

Signed and sealed this 10th day of July 1973.

(SEAL)
Attest:

EDWARD M. FLETCHER, JR.          Rene Tegtmeyer
Attesting Officer                Acting Commissioner of Patents